Jan. 15, 1957    M. MORIARTY    2,777,590
LINKAGE DEVICE FOR CONNECTING AN IMPLEMENT TO
THE HYDRAULIC LIFT MECHANISM OF A TRACTOR
Filed March 16, 1954    4 Sheets-Sheet 1

Inventor:
Maurice Moriarty
By: Schroeder, Hofgren,
Brady & Wegner
Attorneys

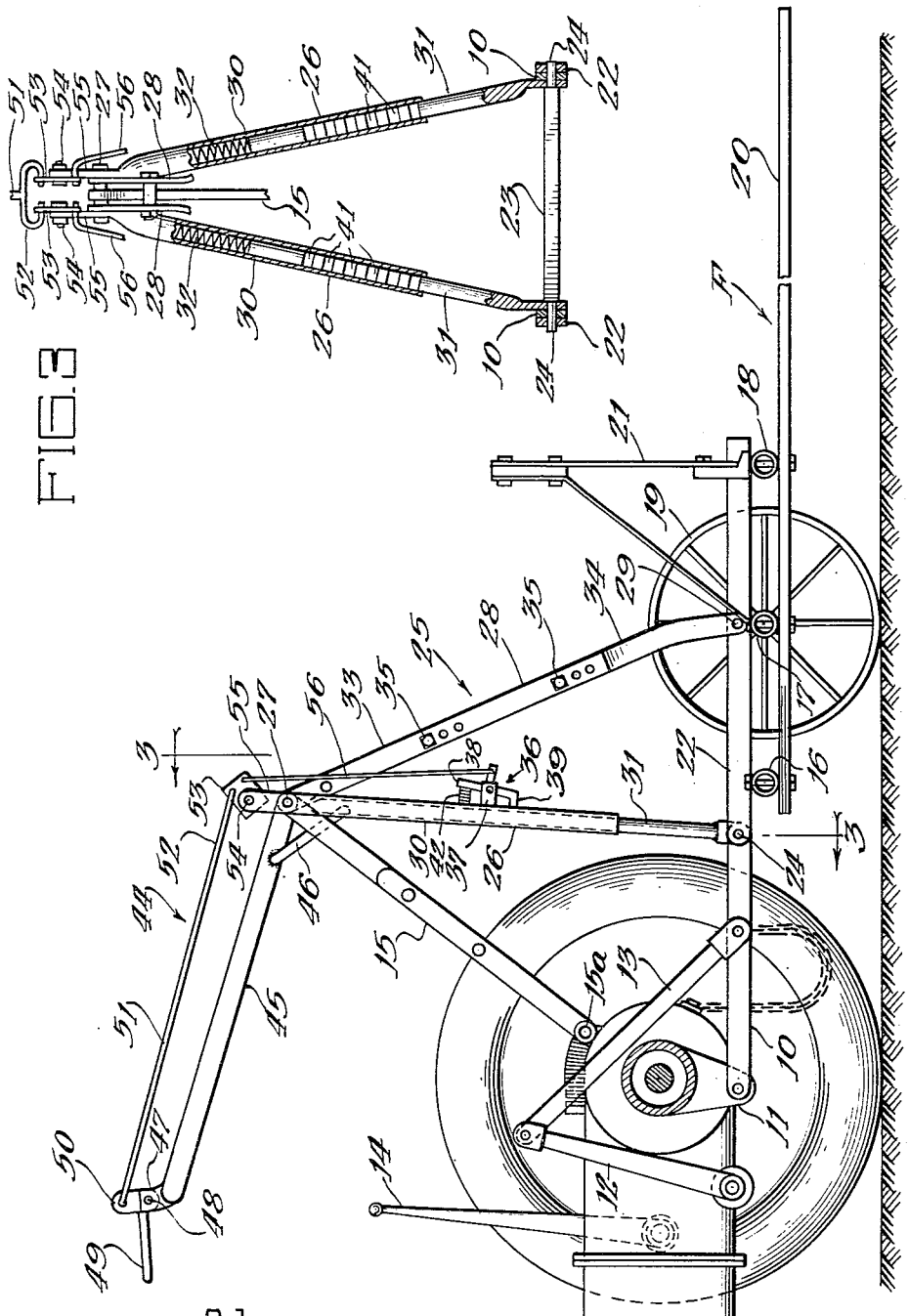

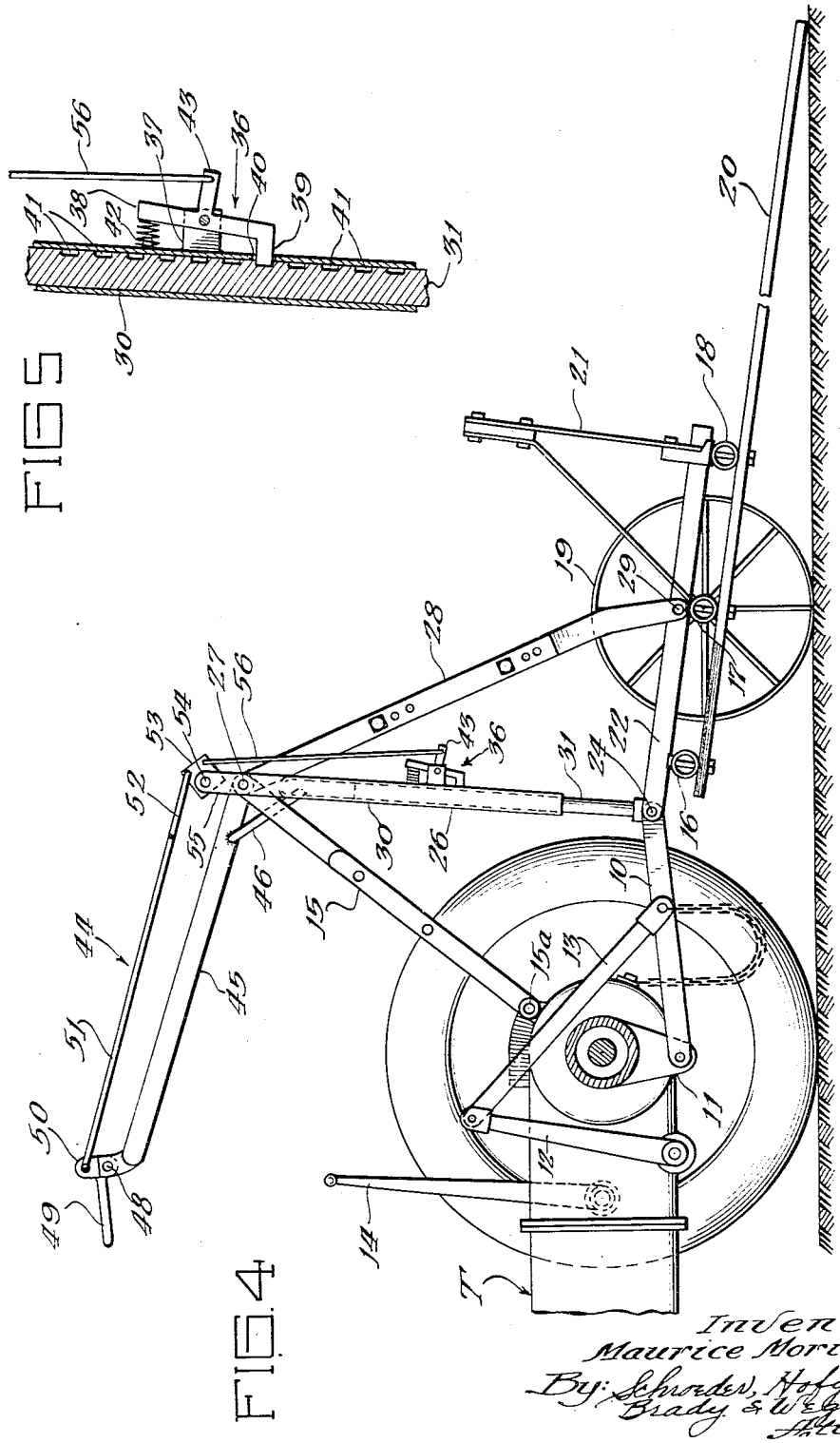

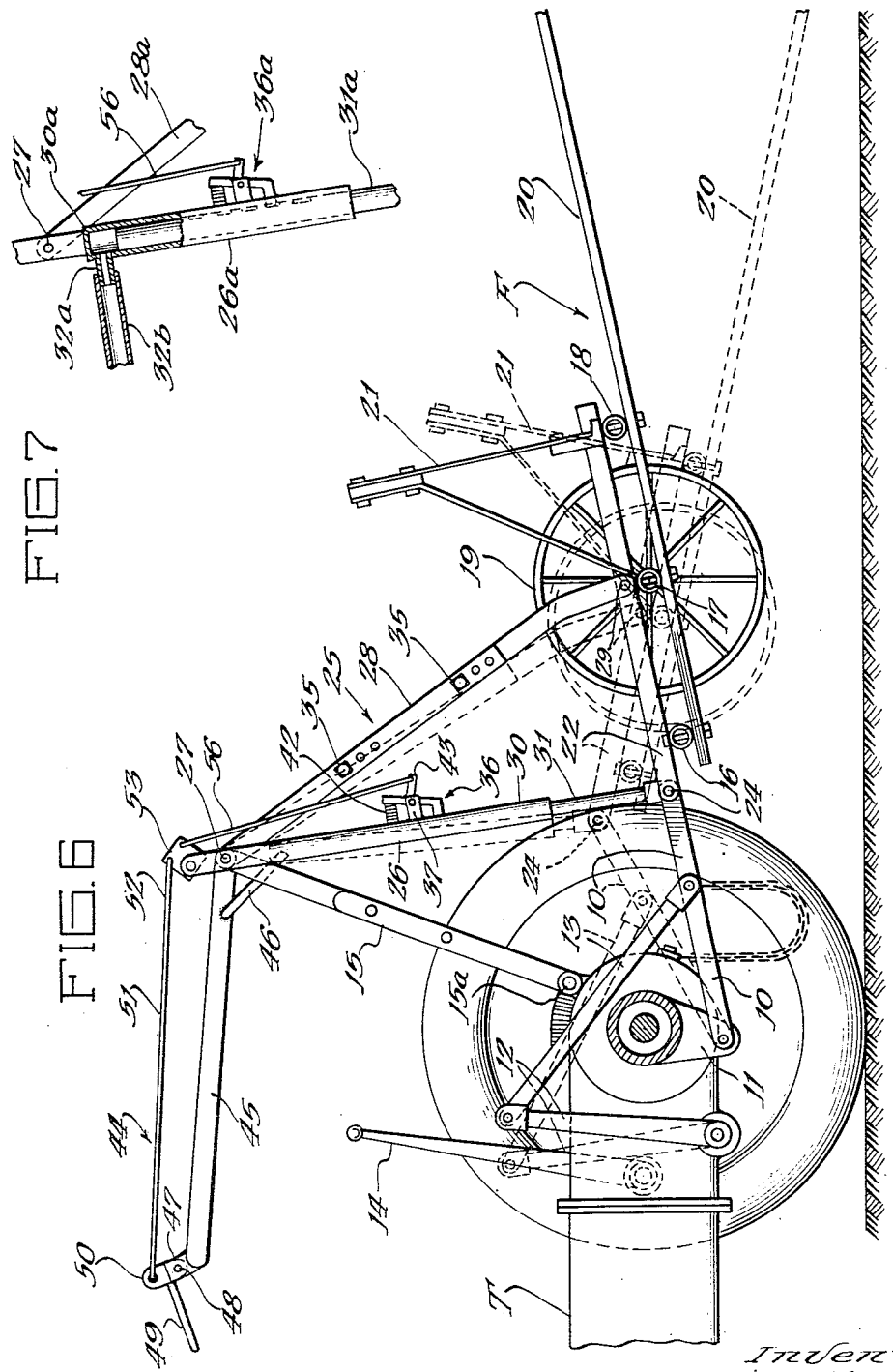

2,777,590

United States Patent Office
Patented Jan. 15, 1957

---

2,777,590

LINKAGE DEVICE FOR CONNECTING AN IMPLEMENT TO THE HYDRAULIC LIFT MECHANISM OF A TRACTOR

Maurice Moriarty, Vayland, S. Dak.

Application March 16, 1954, Serial No. 416,640

14 Claims. (Cl. 214—140)

---

This invention relates to a linkage device for connecting an implement to the hydraulic lift mechanism of a tractor, and in particular it relates to a device by means of which movement of the hydraulic lift mechanism may move the implement bodily or may rock it about a pivot.

Farm tractors are customarily provided with a hydraulic mechanism by means of which implements such as hay forks, earth scrapers, disc harrows, or the like may be raised and lowered. So far as applicant is aware, there has heretofore been no mechanism by means of which an implement could be so linked to the hydraulic lift arms of a tractor that it may be rocked about a pivot, as well as being raised or lowered bodily without the addition of power units other than that with which the tractor is equipped.

There are a great many operations in which it is very desirable to rock an implement on a tractor so as to change the fore-and-aft inclination of the implement with respect to the horizontal; and in accordance with the present invention an implement attached to the tractor lift arms may be rocked by movement of the hydraulic arms, or alternatively the arms may be used to raise and lower the implement bodily. The linkage device is simple and rugged, and the entire operation may be handled by the tractor operator from the tractor seat. Manipulation of a single control handle determines whether the implement will be lifted bodily by the hydraulic lift arms or will be rocked about a pivot when the lift arms are moved.

The invention is illustrated in the accompanying drawings in connection with a hay sweep, but it may also be used with a scraper or grader, a disc harrow having two gangs of discs where it is desired to give one gang greater depth of cut than the other, or may be used in the operation of any other implement where it is desirable to rock the implement about a pivot, as well as to lift it bodily.

In the drawings:

Fig. 2 is a side elevational view of the device with one wheel of the tractor removed to better show the hydraulic linkage;

Fig. 3 is a section taken as indicated along the line 3—3 of Fig. 2;

Fig. 4 is a view similar to Fig. 2 with the sweep in its depressed position;

Fig. 5 is a fragmentary central sectional view on an enlarged scale of the latch mechanism for the telescoping linkage;

Fig. 6 is a view similar to Fig. 2 showing the hay sweep lifted bodily from the ground by the action of the hydraulic lift arms, the sweep being shown in broken lines in a downwardly tilted position; and Fig. 7 is a sectional view of a modified linkage which uses hydraulic pistons in the extensible links.

Figure 1:
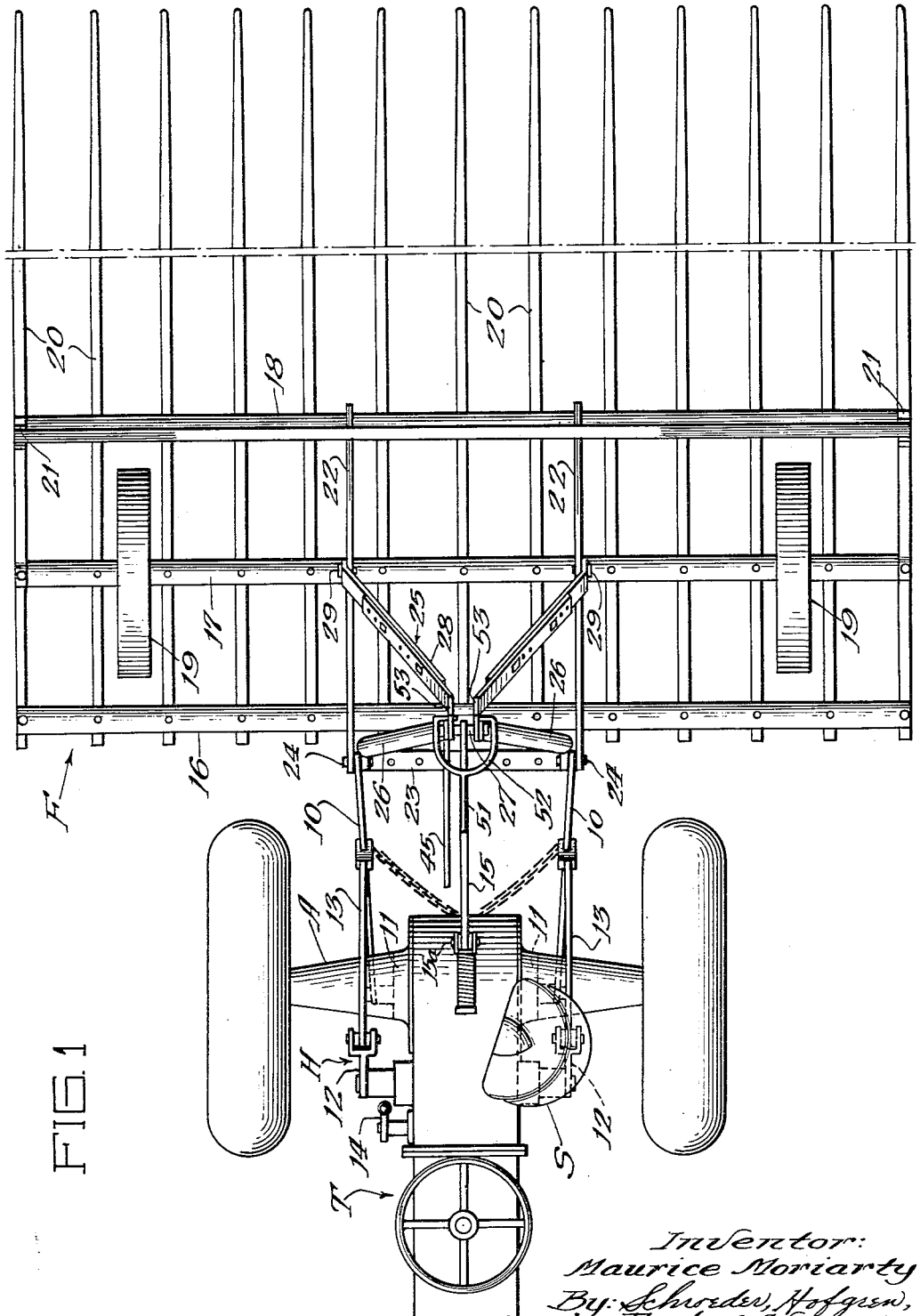
Fig. 1 is a plan view of the linkage device of this invention as it is used to link a hay sweep to the rear hydraulic arm lifts of a tractor.

Referring to the drawings in greater detail, and referring first to Figs. 1 and 2, a tractor T has a rear axle A, a hydraulic lift mechanism indicated generally at H, and a seat S. The hydraulic lift mechanism is of a conventional type which includes a pair of spaced, rearwardly extending lift arms 10 which are pivoted to an extension 11 on the rear axle A of the tractor, the raising and lowering of the lift arm 10 being accomplished by a hydraulic mechanism which acts through a pair of links 12 and 13. The lift arms 10 may swing laterally on the pivots 11, the distance they may swing being limited only by the chains 10a. The hydraulic mechanism is controlled by means of a control lever 14 adjacent the driver's seat S of the tractor. A support bar 15 is secured to a pivot 15a on the differential housing of the rear axle A and extends rearwardly and upwardly so that an implement such as a hay sweep, or fork F may be secured to the lift arms 10 and to the support bar 15.

As best seen in Fig. 1, the hay sweep F has a plurality of parallel, transverse frame members 16, 17 and 18, and a pair of wheels 19 are journaled on the frame member 17. A series of longitudinally extending tines 20 are secured to the transverse frame member 16, 17 and 18, and extend rearwardly so that they may be moved beneath a mass of hay to permit it to be carried away by the tractor; and an upright fence member 21 extends across the hay sweep inner ends of the tines 20 above the transverse frame member 18. A pair of longitudinal attaching arms 22 are secured to the transverse frame members 16, 17 and 18, and are so spaced that they may be connected at their outer ends to the lift arms 10 of the hydraulic mechanism H. At the rear ends of the lift arms 10 is a spreader bar 23 which has laterally extending pivot portions 24 at its outer ends to receive both the lift arm 10 and the attaching members 22 of the hay sweep F, so that the sweep is pivotally connected to the rear ends of the hydraulic lift arms 10.

The mechanism heretofore described is conventional, and the present invention is concerned with the linkage device, indicated generally at 25, by means of which the hay sweep or fork F is linked to the support bar 15 of the hydraulic mechanism. As best seen in Fig. 1, the linkage mechanism 25 consists of a first pair of link members 26 which have their upper ends secured to a pivot 27 on the support bar 15, and which have their diverging lower ends secured to the pivots 24 of the spacer bar 23, so that they have a common pivot with the pivotal connection between the hydraulic lift arms 10 and the attaching bars 22 of the hay sweep F. A second pair of diverging link members 28 have their upper ends secured to the pivot 27 on the support bar 15 and have their lower ends secured to pivots 29 which are positioned in the attaching arms 22 immediately above the transverse frame member 17 upon which the wheels 19 of the hay sweep F are mounted.

As best seen in Figs. 2 and 3, each of the link members 26 has a downwardly extending tubular member 30 within which is telescoped the upper end of an extension leg 31. Coil compression springs 32 are seated on the upper ends of the extension legs 31 so as to normally urge the telescoping members 30 and 31 to their most extended positions, so that each of the link members 26 is extensible in ordinary use. The link members 28, on the other hand, are effectively of fixed length when in use, but are made in two parts 33 and 34 so that they may be adjusted to any one of several fixed lengths by means of bolts 35 which extend through registering apertures in the portions 33 and 34.

Referring now to Fig. 5, a latch mechanism indicated generally at 36 is provided for locking the telescoping members 30 and 31 in any desired extended position. The latch mechanism 36 includes a bracket 37 on the tubular member 30 on which is pivotally mounted a latch arm 38 having a latch finger 39 which extends through an aperture 40 in the wall of the tubular member 30. The latch finger 39 may engage any one of a plurality of spaced latch notches 41 in the extension leg 31. A coil compression spring 42 urges the latch arm 38 to a position in which its finger 39 is normally engaged with one of the notches 41. A latch actuating lug 43 on the latch arm 38 permits the position of the latch 36 to be controlled from the tractor seat S by means of a latch control mechanism indicated generally at 44.

The control means 44 includes a fixed control arm 45 which is secured at its rear end to one of the tubular members 30 adjacent the pivot 27, there being a brace member 46 which has an end welded to the fixed control arm 45 and to the tubular member 30. At the outer end of the fixed control arm 45 is a lug 47 in which is a pivot 48 for a toggle control handle 49 which is alongside the driver's seat S of the tractor. Secured to an extension 50 on the toggle control handle 49 is a latch operating rod 51 the opposite end of which is bifurcated at 52 (see Fig. 3) so as to provide a pair of opposed fingers which extend into apertures in a pair of pivot plates 53 which are mounted on pivots 54 in extensions 55 on the upper ends of the tubular members 30. An upright latch control rod 56 is pivotally secured to each of the pivot plates 53, and each rod 56 extends along one of the tubular members 30, and is pivoted to the actuating lug 43 on one of the two latch mechanisms 36. Thus, if it is desired to merely unlatch the latch member 36 temporarily the toggle control handle 49 may be swung downwardly far enough to disengage the finger 39 from the notch 41 in which it is engaged, and when the handle 49 is released the spring 42 re-engages the latch finger. On the other hand, if it is desired to hold the latch finger 39 out of engagement with the extension leg 31 for a period of time, the toggle control handle 49 may be swung overcenter so as to lock the latch member 36 out of engagement.

The operation of the device is believed to be obvious from the foregoing detailed description. The telescoping members 30 and 31 of the link means 26 are normally urged to their most extended positions by means of the compression spring 32, but may be locked in any desired extended position by means of the latch members 36. In Fig. 2 the telescoping members 30 and 31 are locked in such a position that the mounting arms 22 of the hay sweep F form a straight line extension with the lift arms 10 of the hydraulic mechanism, and are shown in a substantially horizontal position. Referring to Fig. 6, it is seen that if the lift arms 10 are elevated by means of the hydraulic mechanism with the telescoping members 30 and 31 locked by the latch 36 in the position shown in Fig. 2, the entire hay fork or sweep F is lifted off the ground so that a load of hay on the sweep may be rapidly moved about by means of the tractor. By unlatching the telescoping links 26, the sweep may be tilted to the broken line position of Fig. 6 to dump a load, because the weight of the load compresses the springs 32 and rocks the sweep about the pivot 24.

Fig. 4 shows the sweep in a tilted position with the wheels 19 on the ground. This is accomplished by unlatching the latches 36, and elevating the hydraulic lift arms 10 to thrust on the extension legs 31 and compress the springs 32, which rocks the hay sweep F so as to tilt the free ends of the tines 20 down. The hydraulic mechanism H is controlled by the tractor operator in the conventional manner, and by controlling the linkage means 25 through the toggle control handle 49 the operator may also manipulate the hay sweep in the manner just described. While not so indicated in the drawings, it is perfectly possible to elevate the lift arms 10 enough that the wheels 19 of the hay sweep F are completely off the ground, the sweep being then supported on the outer ends of the tines 20 and on the lift arms.

By permitting a total change of about six inches in the height of the telescoping linkage 26, and establishing a distance of 24 inches between the pivots 24 and 29, the outer end of a nine foot long sweep tine 20 is given a total swing of some 27 inches. The entire movement is preferably below the horizontal, because conventional tractor hydraulic lifts only raise the lift arms hydraulically, and permit them to fall by gravity. Thus the sweep could be tilted above the horizontal only by using very strong springs 32 in the telescoping linkage 26, which could force down the hydraulic arms 10 and attaching arms 22 of the sweep. This is undesirable, because if the springs are too strong the lift arms 10 cannot tilt the sweep F in the manner shown in Fig. 4 unless the sweep is very heavy, because the lifting of the arms will merely raise the entire sweep as shown in Fig. 6. The springs 32 for use with a hay sweep may exert a pressure of about 20–25 pounds each when fully compressed; and with heavier appliances or those which are differently balanced heavier springs may be used.

In ordinary bucking or sweeping of hay it is most desirable to lock the latches 36 open by throwing the toggle lever 49 to its overcenter position. This allows the sweep to oscillate up and down with the contour of the surface of the ground between bunches of hay. The tines of the hay sweep are run under a bunch of hay by backing the tractor toward the hay bunch, and by moving the hydraulic control handle 14 a sufficient distance the tines may be tilted downwardly so as to pass neatly under the hay.

When the tines 20 have a full load of hay, the hydraulic control lever 14 is moved so as to lower the lift arms 10 until the sweep arms are substantially horizontal. The toggle control lever 49 may then be raised to engage the latch 36 in one of the notches 41 of the extension leg 31. The load of hay may then be wheeled to a collection point with the wheels 19 of the sweep rolling on the ground, or the lift arms 10 may be elevated to move the sweep entirely above the ground if the ground surface is particularly rough.

The tilting of the hay sweep tines is particularly useful in rocky ground, where the tines may be elevated and lowered several times during a single loading operation to avoid running into rocks. Since the lift arms 10 are freely swingable laterally, being restrained only by the chains 10a, the hay sweep may swing sideways if a tine strikes a small boulder around which it may move without tooth breakage.

As seen in Fig. 3, the links 28 are so constructed that they may be swung on the pivot 27 to a position forwardly of the extensible links 26. This permits the fixed links 28 in certain cases to be secured to the pivot 24 at the rear of the lift arms 10, and extensible links 26 may be secured to the pivot 29, which is advantageous in certain situations.

The reversal of the extensible links 26 is especially useful in connection with the device of Fig. 7, which substitutes a hydraulic piston for the spring loaded extension legs 31.

The device shown in Fig. 7 is identical with that heretofore described except that the extensible link members 26a comprise a hydraulic cylinder 30a and a hydraulic piston 31a. At the upper end of the hydraulic cylinder 30a is a fluid inlet boss 32a which is suitably threaded to receive a fluid line 32b from the hydraulic pump on the tractor. The fluid line 32b is provided with a suitable valve control within reach of the tractor operator so that he may control the admission of fluid to the hydraulic cylinder. The valve is of conventional type which admits fluid under pressure or permits it to bleed back into the fluid reservoir. Thus, when fluid under pressure is admitted to the cylinder the piston 31a is urged toward extended position, and when fluid is permitted to bleed back into the fluid reservoir the extensible members may be returned to their retracted positions.

The device of Fig. 7 has link members 28a of fixed length which are identical with the link members 28 in the form of the device first described, and a latch mechanism 36a for the extensible links 26a is also identical with that in the form first described.

As previously pointed out, the hydraulic mechanism is particularly advantageous when the extensible links 26a and the fixed links 28a are disposed with the extensible links to the rear of the fixed links, because the hydraulic system permits positive downward pressure to be applied to the implement which is being used. Thus, in the case of a dirt scoop it may be forced into the ground to take a bite of earth in a manner which is not practical with the spring operated extension linkages first described because of the limitations previously noted as to the strength of springs which may be used.

The foregoing detailed description is given for clearness of understanding only and no unnecessary limitations are to be understood therefrom, as some modifications will be obvious to those skilled in the art.

I claim:

1. A device for linking an implement to a tractor provided with a pair of lift arms with which the implement is pivotally connected, hydraulic mechanism for swinging the lift arms in a vertical plane, and a support bar pivoted on the tractor in a longitudinal plane which extends between the lift arms, comprising: first link means pivotally secured to the support bar and to the pivotal connection between the lift arms and the implement; second link means pivotally secured to the support bar and to a part of the implement which is spaced longitudinally from said pivotal connection, one of said link means being of fixed length and the other having a pair of telescoping members; compressible means for normally extending said telescoping members to their greatest length; and latch means adjacent the telescoping members which have portions detachably engageable with said members, said latch means being movable between a disengaged position and an engaged position to latch said telescoping members together in any desired position, so that movement of the lift arms with the latch means in engaged position moves the implement bodily while movement of the lift arms with the latch means in disengaged position changes the relative positions of the telescoping members and rocks the implement.

2. The device of claim 1 in which each link means is in the form of an inverted V, and the link means are connected to the support bar by a common pivot.

3. The device of claim 2 in which the positions of the link means with respect to one another may be reversed by swinging them on their common pivot.

4. The device of claim 1 in which the compressible means comprises a coil compression spring within one of the telescoping members which bears upon the other telescoping member.

5. The device of claim 1 which includes means for controlling the position of the latch means from the tractor seat.

6. The device of claim 5 in which the means for controlling the position of the latch means includes a toggle lever which has an overcenter position to lock the latch means in disengaged position.

7. The device of claim 1 in which the latch means includes a series of spaced notches in the inner telescoping member and a pivoted latch arm on the outer telescoping member which has a finger extending through a hole in said outer member to engage with one of said notches.

8. The device of claim 1 in which the first link means has the pair of telescoping members, so that elevation of the lift arms with the latch means disengaged rocks the implement about its pivotal connection with the second link means and lowers the outer end of the implement.

9. The device of claim 1 in which the link means of fixed length may be adjusted to any of several fixed lengths.

10. The device of claim 1 in which the compressible means consists of compression spring means.

11. The device of claim 1 in which the telescoping members comprise a hydraulic cylinder and piston and the compressible means comprises a controllable fluid supply for said hydraulic cylinder.

12. The device of claim 10 in which a fixed control arm is secured to an upper part of one of the extensible links and has its free end adjacent the tractor seat, a latch control handle is pivoted to the control arm adjacent the seat, and link means connects said control handle to the latch means.

13. A device for linking an implement to a tractor provided with a pair of lift arms with which the implement is pivotally connected, hydraulic mechanism for swinging the lift arms in a vertical plane, and a support bar pivoted on the tractor in a longitudinal plane which extends between the lift arms, comprising: an extensible pair of downwardly diverging links pivoted at their upper ends to said support bar and at their lower ends to the pivotal connection between the lift arms and the implement, each of said links including a pair of telescoping members; a second pair of downwardly diverging links pivoted at their upper ends to the support bar at the same point as said extensible links and to the implement at a fulcrum spaced longitudinally from said pivotal connection; compressible means for normally extending said telescoping members to their greatest length; and latch means adjacent the telescoping members which have portions detachably engageable with said members, said latch means being movable between a disengaged position and an engaged position to latch said telescoping members together in any desired position, so that movement of the lift arms with the latch means in engaged position moves the implement bodily while movement of the lift arms with the latch means in disengaged position changes the relative positions of the telescoping members and rocks the implement.

14. A device for linking an implement to a tractor provided with a pair of lift arms with which the implement is pivotally connected, hydraulic mechanism for swinging the lift arms in a vertical plane, and a support bar pivoted on the tractor in a longitudinal plane which extends between the lift arms, comprising: first link means pivotally secured to the support bar for swinging movement parallel to the plane of the support bar; second link means pivotally secured to the support bar for swinging movement parallel to the plane of the support bar, the relationship between the pivotal connections of said two link means with the support bar being such that the positions of the link means may be reversed by pivoting them in opposite directions on the support bar, one of said link means being of fixed length and the other including a hydraulic cylinder with a fluid inlet near its upper end and a piston in said cylinder which is moved down when fluid is admitted to the cylinder so as to extend the length of said other link means; a controllable fluid supply for said cylinder; means for releasably retaining said cylinder and piston in any desired extended position; an implement; a first pivot connecting the implement to the lift arms and to one of said link means; and a second pivot pivotally connecting the implement to the other of said link means.

References Cited in the file of this patent

UNITED STATES PATENTS

| 2,426,544 | Wooldridge | Aug. 26, 1947 |
| 2,605,987 | Brown et al. | Aug. 5, 1952 |